United States Patent

[11] 3,589,045

| [72] | Inventor | Joseph Rakowsky<br>Colonia, N.J. |
|---|---|---|
| [21] | Appl. No. | 784,554 |
| [22] | Filed | Dec. 18, 1968 |
| [45] | Patented | June 29, 1971 |
| [73] | Assignee | Visual Effects, Inc.<br>New York, N.Y. |

[54] METHOD AND APPARATUS FOR PRODUCING A CHANGING PATTERN
4 Claims, 7 Drawing Figs.

[52] U.S. Cl. ............................................. 40/106.54, 40/137
[51] Int. Cl. .................................................. G09f 13/36
[50] Field of Search ........................................... 40/106.51−106.54, 137, 125 L

[56] References Cited
UNITED STATES PATENTS
1,006,769  10/1911  Merrill ........................ 40/137 UX 1,347,793  7/1920  Saalburg ........................ 40/125 (L)
1,761,802  6/1930  Sabath ........................... 40/106.54 X
1,867,051  7/1932  Bareis ........................... 40/125 (L)

FOREIGN PATENTS
661,718  3/1929  France ........................ 40/137

Primary Examiner—Robert W. Michell
Assistant Examiner—Richard Carter
Attorney—Kane, Dalsimer, Kane, Sullivan and Smith ABSTRACT: Two like designs are formed, one on a transparent surface, with the two designs spatially separated from each other. When the angle of viewing of one design with respect to the other is changed, either through movement of an observer, or through movement of one or both of the design surfaces, the effect created is one of a constantly changing pattern.

PATENTED JUN 29 1971

INVENTOR
JOSEPH RAKOWSKY
BY
ATTORNEYS

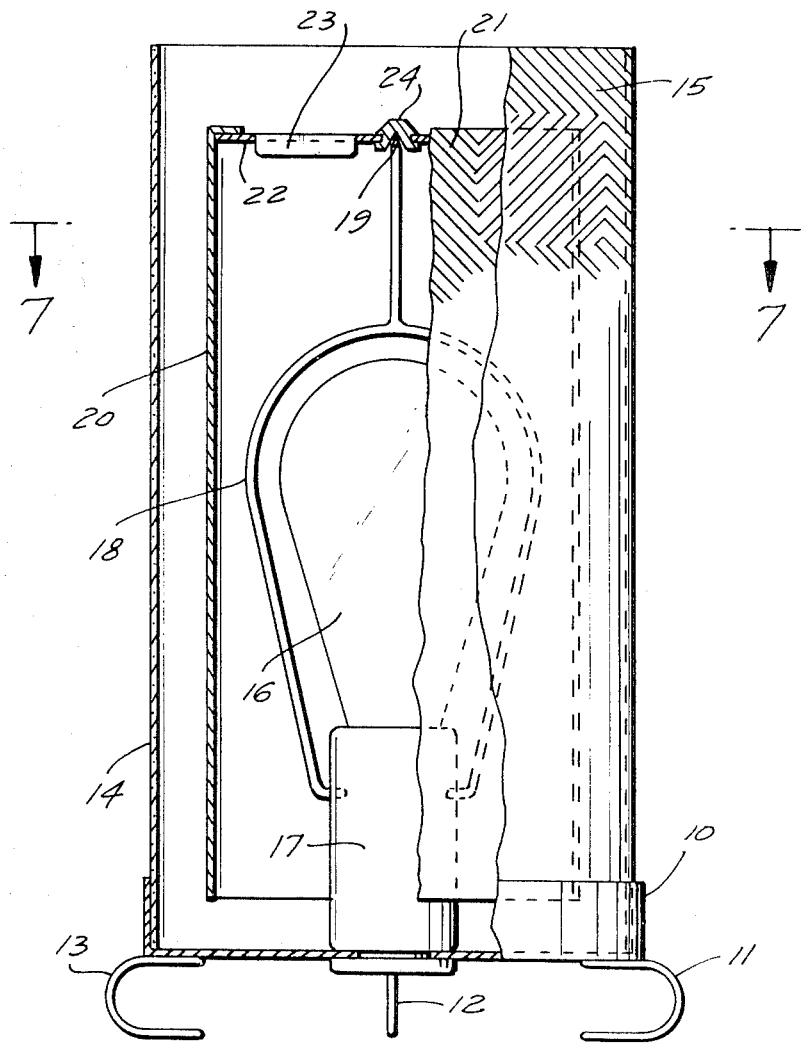
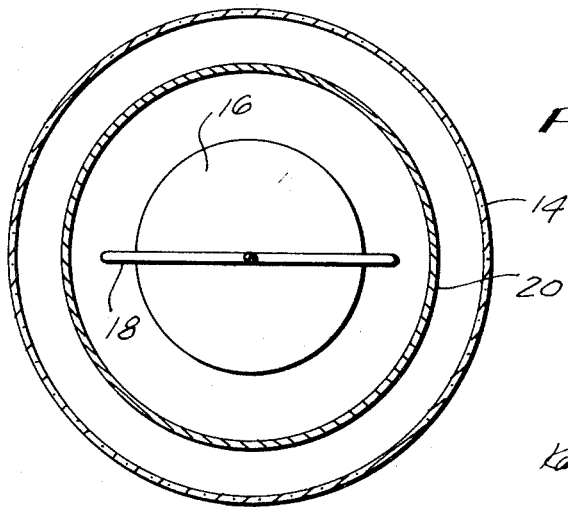

METHOD AND APPARATUS FOR PRODUCING A CHANGING PATTERN

BACKGROUND OF THE INVENTION

The present development relates to method and apparatus for producing visual, artistic effects. More particularly, the present invention relates to a method and apparatus wherein two stationary designs are so formed as to create the effect of a moving, constantly changing design.

Various methods have been shown in the prior art wherein a stationary design can create the effect of a moving design. For example, such an effect is actually created in motion pictures wherein a series of still pictures are projected onto a surface at a rate of speed such that the impression on the human eye is one of movement of the designs or characters projected. In a simpler manner, this same effect is created by the riffling of a series of papers or cards arranged in a particular order, where each successive card shows the character or design in a slightly different position from the previous design.

The effect is also known to be produced in surfaces having a series of peaks and valleys wherein the design on one of the slopes which angles toward the peak is different from the design on the other slope. Thus, as this surface moves relative to the eye of the viewer, the effect is one of a constantly changing or moving picture.

Each of these prior art systems requires relatively great care in the formation of the particular objects in order to assure that the effect of motion is produced under the desired circumstances.

SUMMARY OF THE INVENTION

In accordance with the present invention it has been discovered that the effect of a moving, constantly changing design can be accomplished by the formation of identical designs on each of two surfaces, where the two surfaces are superimposed, but spatially separated. To permit creation of the effect, i.e., so that the design on the surface furthest from the viewer can be seen, the design closest to the viewer should be formed upon a transparent substance. The relative positions of the two superimposed designs should be fixed, in at least one dimension.

The effect created, according to the present invention, can be utilized in a number of ways. For example, a package or display box can be formed such that the inside bottom of the box is printed with a design, or a sheet with the design printed on it can be placed within the inside bottom, and the second design, formed on a relatively transparent material, is either formed on the box top, or placed on or within the box top. The walls of the box act to spatially separate the two designs.

With this embodiment of the invention, if the package or display box is held stationary and the viewer moves, the result is a constantly changing pattern caused by the relative positioning of the lines of the top design, with respect to the lines of the bottom design. Further, the viewer can remain stationary and the box can be moved from side-to-side, up and down, or about an axis, to create the same effect. In either event, as a straight line drawn from the eye of the viewer through the upper design on the transparent surface will reach a different position on the bottom design with the relative movement, the bottom design will appear to intersect the lines of the upper design at constantly changing points to create the effect of a moving, and changing design.

In a further embodiment of the invention, a decorative lamp can be formed with a central light source, a surrounding, concentric cylinder which is preferably translucent and which has the design formed upon it, and a second, outer concentric cylinder preferably formed of a transparent material, upon which the second, but identical, design is formed. When either of the cylinders is moved, by any means, the effect is the same as that created by movement of the previously referenced display box relative to the viewer, or movement of the viewer with respect to the box. Again, as at least one of the cylinders is moved, the relative positioning of the design on the inner cylinder with respect to the design on the outer cylinder changes and, to the eye of the viewer, the effect is one of a constantly changing and moving pattern.

The designs which can be employed according to this invention are generally geometric in form and can consist of either straight or curved lines, in various patterns.

It is thus an object of the present invention to provide a method for creating the effect of a constantly moving and changing design.

It is a further object of this invention to provide an apparatus which is so constructed that movement of the apparatus or of a viewer creates the effect of a moving and constantly changing design.

BRIEF DESCRIPTION OF THE DRAWINGS

In the accompanying drawings:

FIG. 6 is a detailed, elevational view, partially broken away, of a decorative lamp formed according to the present invention; and FIG. 7 is a sectional view along the line 7–7 of FIG. 6.

DESCRIPTION OF THE PREFERRED EMBODIMENTS

Figure 1:
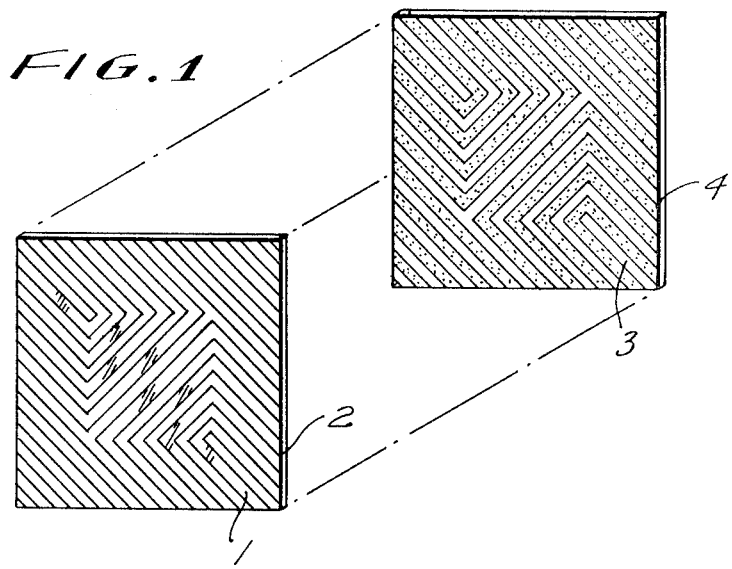
FIG. 1 is a perspective view of the two designs of the present invention, spatially separated.

Referring to the accompanying drawings, and particularly FIG. 1, a first design 1 is shown formed on a surface 2 which is superimposed on, but spatially separated from a second design 3, formed on a second surface 4. The first surface is relatively transparent, while the second surface is, preferably, opaque or translucent. However, the second surface, too, can be transparent.

Figure 2:
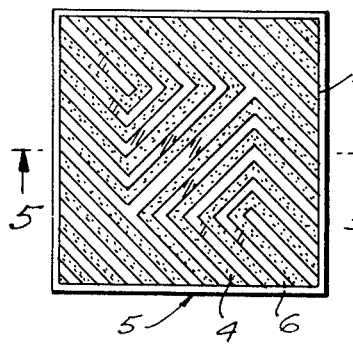
FIG. 2 is a top view of an apparatus of the present invention showing the two designs superimposed so as to appear as one design.
Figure 5:
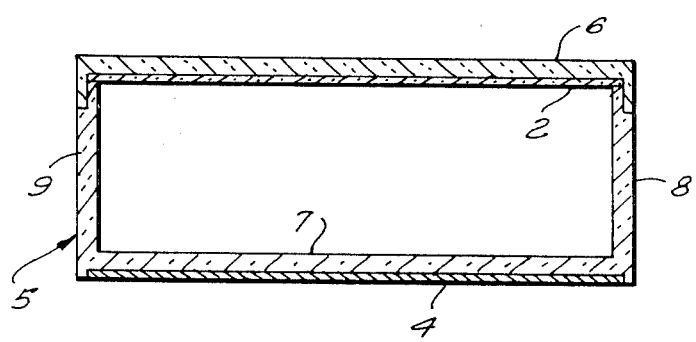
FIG. 5 is a sectional view along the line 5–5 of FIG. 2.

FIGS. 2 and 5 show the design surfaces of FIG. 1 as they might be used in one embodiment of this invention in a package or display box. In FIG. 2 only the design 1 is seen as, because of the identity of designs 1 and 3, a view straight through the first surface 2 will show the corresponding blank portions of the design 3 and thus the device will appear to have only one design. FIG. 5 shows the second surface 4, adhered by any known means, to the bottom of a boxlike structure 5 and the first surface 2 supported in the top of a removable box cover 6. The surface 4 can be adhered, for example, by gluing, force fitting, etc. Thus, it can be placed within the lower surface of the box by any desired means, so long as it is viewable through the top surface or cover 6 and so long as the design formed on the surface 4 is identical to the design formed on the surface 2. Further, it should be realized that though according to FIG. 5, the designs are formed on surfaces which are inserted into the overall box structure, they can actually be formed directly on the cover 6 and on the bottom 7 of the box 5. The designs on the surfaces 2 and 4 are spatially separated and held in position by the walls 8,9 of the boxlike structure 6.

Figure 3:
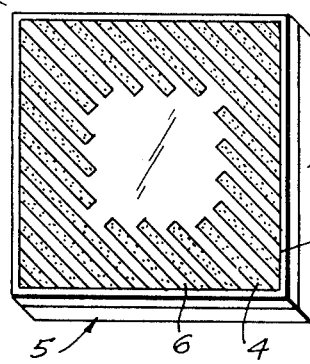
FIG. 3 is a perspective view of the device of FIG. 2 tilted about an axis running from the lower left corner to the upper right corner, representing the design effect created.
Figure 4:
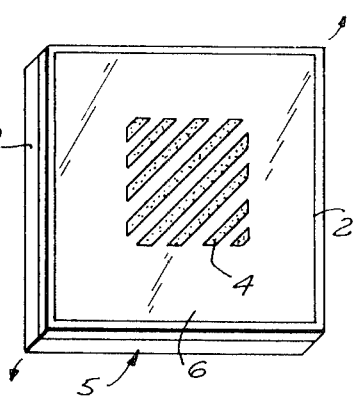
FIG. 4 is a view similar to FIG. 3 showing the device tilted about an axis running from the upper left corner to the lower right corner.

The changing design effect created by movement of the viewer or by movement of the boxlike structure is partially represented in FIGS. 3 and 4. Each of these figures is drawn as if the viewer were stationary and the box moved to create the effect of the moving, changing design. The design illustrated in each of FIGS. 1 through 5 is essentially a series of "U's" of constantly diminishing size from the center, with an outline of straight lines. This is the design which is seen when the boxlike structure is viewed straight on, as in FIG. 2. When the box is tilted about an axis running from the lower left corner to the upper right corner, the lines of the design are superimposed in such a way that the center of the box appears relatively blank or, if the design lines are formed in black, then the center appears black, while the remaining portions of the design give the appearance of straight lines. In FIG. 4, proper tilting of the box about the axis running from its lower left corner to its upper right corner gives the appearance of a solid black design about the periphery, or a blank, depending upon the colors of the lines, with the impression of a series of diagonal lines of diminishing length at the center.

It should be appreciated that the design illustrated in FIGS. 1 and 2 is only one of an almost infinite variety of designs which can be formed in a geometric pattern to create the effect described. The lines can, for example, be curved, or be straight lines in another form. The lines can be of any color and, if desired, either of the surfaces can be colored or tinted to contrast with the colors of the design. The effect of the moving, constantly changing design will still be present, but the particular design viewed, as, for example, in FIGS. 3 and 4, will be different.

A second embodiment of the present invention is shown in FIG. 6 wherein a decorative lamp is illustrated. The lamp comprises, essentially, a stationary base 10 having three supporting legs 11, 12, 13. An outer cylinder 14 is supported by this stationary base and a first geometric design 15 is formed on this cylinder, which is preferably made of a relatively transparent material. At the center of the lamp is a light source, as a standard light bulb 16, which is supported in and supplied with power from, through means not shown, a standard lamp socket 17. A support member 18 with a thrust bearing 19 is supported by the socket 17. A second cylinder 20 is supported in any convenient manner on the thrust bearing 19. A second design 21 is formed on the second cylinder which is preferably formed of a translucent material. While the changing design effect could equally be created with the cylinder 20 formed of a transparent material the resulting glare of the light source 16 to the viewer would be extremely disturbing.

As shown in FIG. 6, the cylinder 20 is supported upon a circular member 22 which is formed with a series of angled vanes 23. These vanes are formed by pressing tabs from the surface of the circular member and the result is a series of openings in the circular member. At the center of the circular member is a bushing 24 which rests upon the thrust bearing 19. This acts to support the circular member 22 and, through it, the inner cylinder 20. The cylinder is thus supported for rotation about the pivot formed by the thrust bearing 19 and bushing 24.

Through means well known in the art, the heat rising from the light source 16 passes through the openings in the circular member 22 formed by pressing out of the vanes 23, thus providing energy which rotates the inner cylinder 20 about the pivot. As the inner cylinder rotates the relative positions of the design 15 on the outer cylinder and the design formed on the inner cylinder 20 constantly change. In this manner, the effect of a constantly changing and moving design is created in the same manner as the effect was created by tilting of the relatively placed designs illustrated in FIGS. 1 through 5, or movement of the viewer relative to the structure illustrated in those figures.

It will, of course, be apparent that if the designs formed on the spatially separated surfaces of either of the embodiments, or of any other embodiment wherein two or more designs are spatially separated as described herein, are not the same, an effect will still be created of a constantly moving and changing design. However, the effect will not be the same as that created where the two surfaces are provided with the same designs, superimposed.

I claim:

1. Means for creating the effect of a moving, changing design comprising:
   a. a first transparent surface having a geometric design formed thereon, said design comprising a first set of lines generally parallel to each other, and at least a second set of lines formed at an angle to said first set of lines and connected to said first set of lines at selected points so as to form a regular geometric pattern; and
   b. a second surface, geometrically spaced to the rear of said first surface and having an identical geometric design thereon, said designs being superimposable in at least one viewing position.

2. The means of claim 1 wherein the second surface, prior to application of said design, is translucent or opaque.

3. The means of claim 1 wherein said surfaces lie in parallel planes and are formed in, respectively, the top and bottom of a display package.

4. The means of claim 1 wherein said surfaces are cylindrical, the cylindrical surfaces being concentric and spatially separated, at least one of said surfaces being adapted for rotational movement about its axis.